(12) United States Patent
Wortman et al.

(10) Patent No.: US 7,295,641 B1
(45) Date of Patent: Nov. 13, 2007

(54) PHASE ALIGNMENT CIRCUITRY AND METHODS

(75) Inventors: Curt Wortman, Ottawa (CA); Jean Luc Berube, Hull (CA)

(73) Assignee: Altera Corporation, San Jose, CA (US)

( * ) Notice: Subject to any disclaimer, the term of this patent is extended or adjusted under 35 U.S.C. 154(b) by 716 days.

(21) Appl. No.: 10/722,665

(22) Filed: Nov. 26, 2003

(51) Int. Cl.
*H04L 25/00* (2006.01)
*H04L 25/40* (2006.01)

(52) U.S. Cl. .................. 375/371; 375/355; 375/372; 375/373; 375/362; 370/324

(58) Field of Classification Search ............... 375/329, 375/330, 226, 371, 362, 374, 372, 355, 376, 375/375, 365; 370/324; 327/152, 141
See application file for complete search history.

(56) References Cited

U.S. PATENT DOCUMENTS

| | | | | |
|---|---|---|---|---|
| 5,459,753 A * | 10/1995 | Co et al. | ............. | 375/362 |
| 5,485,490 A * | 1/1996 | Leung et al. | ............. | 375/371 |
| 5,533,072 A * | 7/1996 | Georgiou et al. | ............. | 375/371 |
| 5,533,073 A * | 7/1996 | Eriksson | ............. | 375/371 |
| 5,535,252 A * | 7/1996 | Kobayashi | ............. | 375/371 |
| 5,673,295 A * | 9/1997 | Read et al. | ............. | 375/356 |
| 6,288,656 B1 * | 9/2001 | Desai | ............. | 341/100 |
| 6,304,623 B1 * | 10/2001 | Richards et al. | ............. | 375/355 |
| 6,307,869 B1 * | 10/2001 | Pawelski | ............. | 370/516 |
| 6,347,128 B1 * | 2/2002 | Ransijn | ............. | 375/376 |
| 6,363,129 B1 * | 3/2002 | Agazzi | ............. | 375/355 |
| 6,650,140 B2 | 11/2003 | Lee et al. | ............. | 326/39 |
| 7,031,420 B1 * | 4/2006 | Jenkins et al. | ............. | 375/371 |
| 2001/0033188 A1 * | 10/2001 | Aung et al. | ............. | 327/141 |

OTHER PUBLICATIONS

U.S. Appl. No. 10/059,014, filed Jan. 29, 2002, Lee et al.
U.S. Appl. No. 10/349,541, filed Jan. 21, 2003, Venkata et al.
U.S. Appl. No. 10/672,901, filed Sep. 26. 2003, Asaduzzaman et al.
U.S. Appl. No. 10/713,877, filed Nov. 13, 2003, Churchill et al.
U.S. Appl. No. 10/470,120, filed Dec. 17, 2003, Wang et al.
U.S. Appl. No. 10/739,445, filed Dec. 17, 2003, Wang et al.

* cited by examiner

*Primary Examiner*—Mohammed Ghayour
*Assistant Examiner*—Qutub Ghulamali
(74) *Attorney, Agent, or Firm*—Ropes & Gray LLP; Robert R. Jackson

(57) ABSTRACT

The phase of a data signal relative to a reference clock signal is approximated relatively accurately using only relatively coarse increments of phase shift between trial version of a sampling clock signal (derived from the reference clock signal). Information about which amounts of progressively greater phase shift in the sampling clock signal cause loss of alignment between a training pattern and training data in the data signal can be used for such purposes as identifying the amount of phase of shift of the reference clock signal that will be best for use in sampling the data signal during normal (post-training) operation.

21 Claims, 10 Drawing Sheets

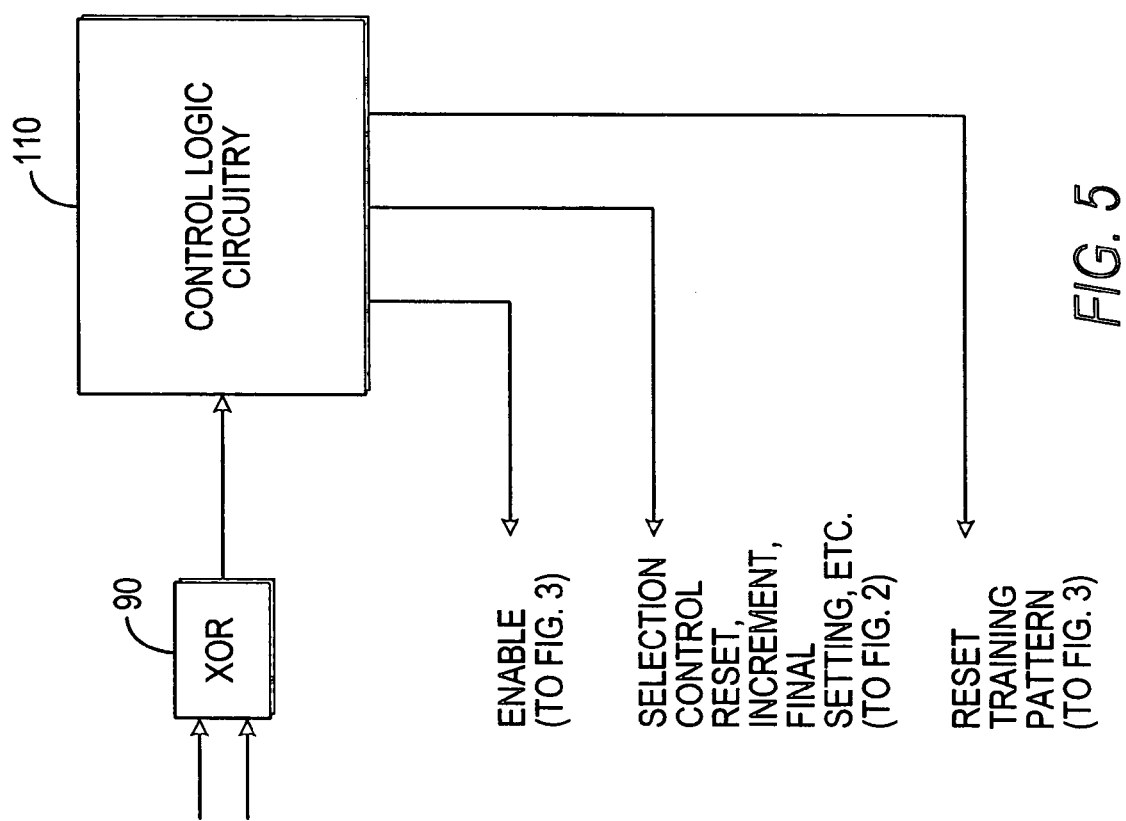

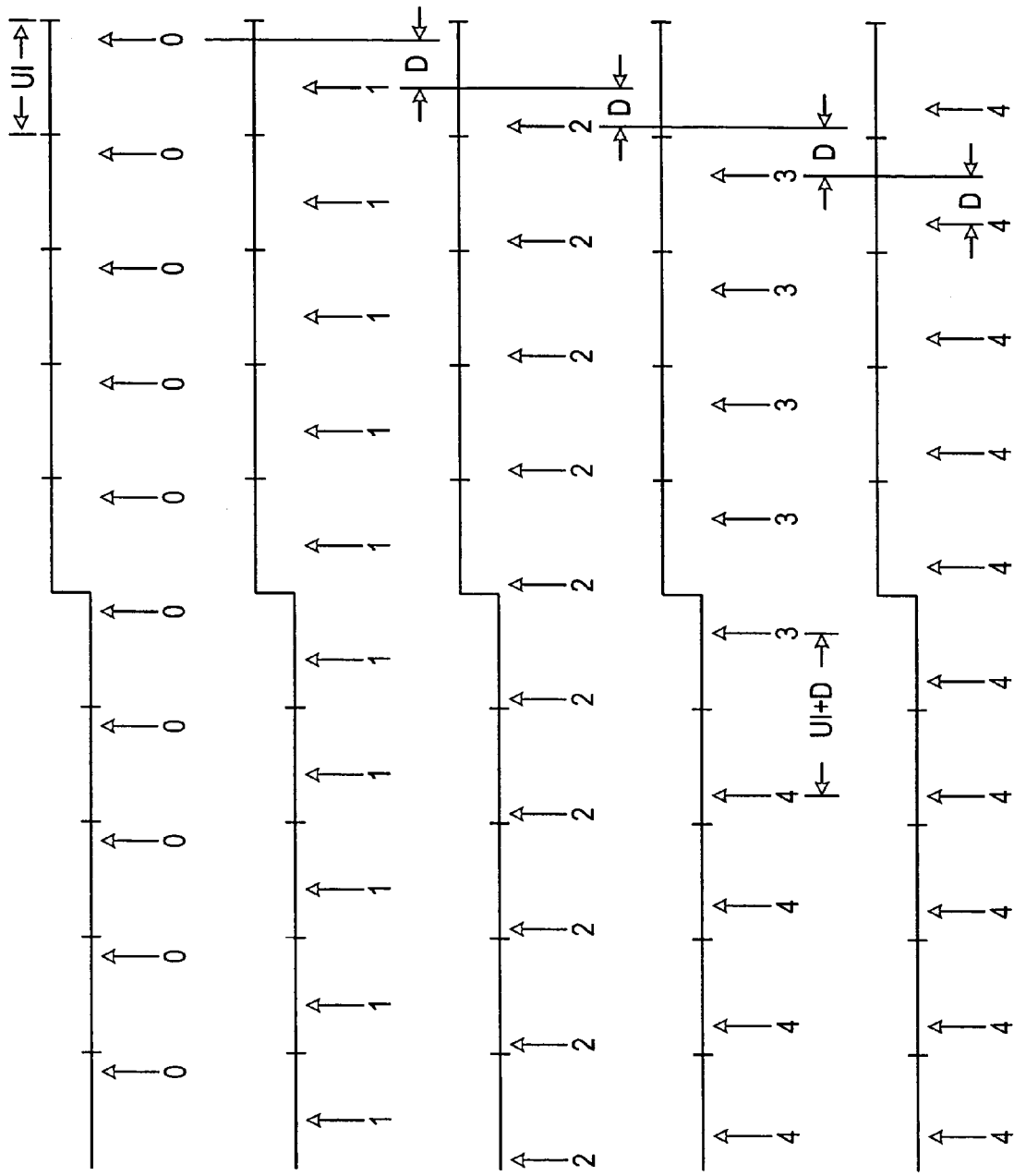

PHASE ALIGNMENT CIRCUITRY AND METHODS

BACKGROUND OF THE INVENTION

This invention relates to data transmission systems, and more particularly to phase-synchronizing or phase-aligning a received data signal with a received reference clock signal.

Some data transmission systems send one or more serial data streams in parallel with a reference clock signal. For ease of reference it will generally be assumed herein that there is one data stream in parallel with the reference clock signal, but those skilled in the art will appreciate that any number of data streams can be sent in parallel with the reference clock signal. The transmitter in such systems generally outputs the data stream and the reference clock signal in phase and frequency synchronism with one another. However, phase synchronism may be lost by the time these signals reach the receiver. This may be due to any number of reasons, such as slightly different transmission characteristics of the transmission paths for the two signals from the transmitter to the receiver.

The receiver typically needs to use the reference clock signal to capture the data in the data signal. If the reference clock signal is not received by the receiver in phase synchronization with the data signal, the reference clock signal cannot be reliably used to capture the received data signal. For example, some of the data may be misinterpreted and data errors may result. The specifications of some signalling systems may require that the received data signal be clocked very near the center of the "eye" of the unit interval of the data signal to help ensure zero or acceptably low data error rates. (The unit interval ("UI") is the duration of any one bit in the data signal.) For example, such signalling systems may have relatively loose specifications regarding data signal jitter and/or communication path quality, so that clocking the received data very near the center of the unit interval eye is especially important for correct interpretation of the received data.

SUMMARY OF THE INVENTION

In accordance with the invention, methods and apparatus are provided for determining what amount of phase shift of reference clock signal information will render that information advantageously phased for use in sampling a data signal that may otherwise be skewed relative to the reference clock signal information. The methods and apparatus of the invention preferably make use of phase shift increments that are relatively coarse in relation to the data signal unit interval (i.e., duration of each bit in the data signal). The phase shift increments employed are also preferably not such that an integer multiple of the amount of delay producing each increment equals the unit interval.

A plurality of phase-shifted versions of the reference clock signal are produced. These versions are used one after another, in order of amount of phase shift, as a sampling clock signal. The sampling clock signal is used to sample the data signal, and also to shift (preferably in a recirculating fashion) a training pattern. The training pattern is initially aligned with training data in the data signal. Each time a version of the reference clock signal (in use as the sampling clock signal) causes the training pattern to become misaligned with the training data, the training pattern is re-aligned with the training data and the version of the reference clock signal being used is incremented. The reference clock signal version being used is also incremented whenever the training pattern can be completed without detection of misalignment with the training data. The reference clock signal versions that caused misalignment are particularly useful in determining the phase of the data signal relative to the reference clock signal.

Further features of the invention, its nature and various advantages, will be more apparent from the accompanying drawings and the following detailed description of the preferred embodiments.

BRIEF DESCRIPTION OF THE DRAWINGS

FIG. 5 is a more detailed, but still simplified, schematic block diagram of an illustrative embodiment of a portion of a system like that shown in FIG. 1 in accordance with the invention.

FIGS. 6a-6e are successive portions of an illustrative data signal waveform and associated illustrative indicia that are useful in explaining operations in accordance with the invention.

DETAILED DESCRIPTION

Figure 1:
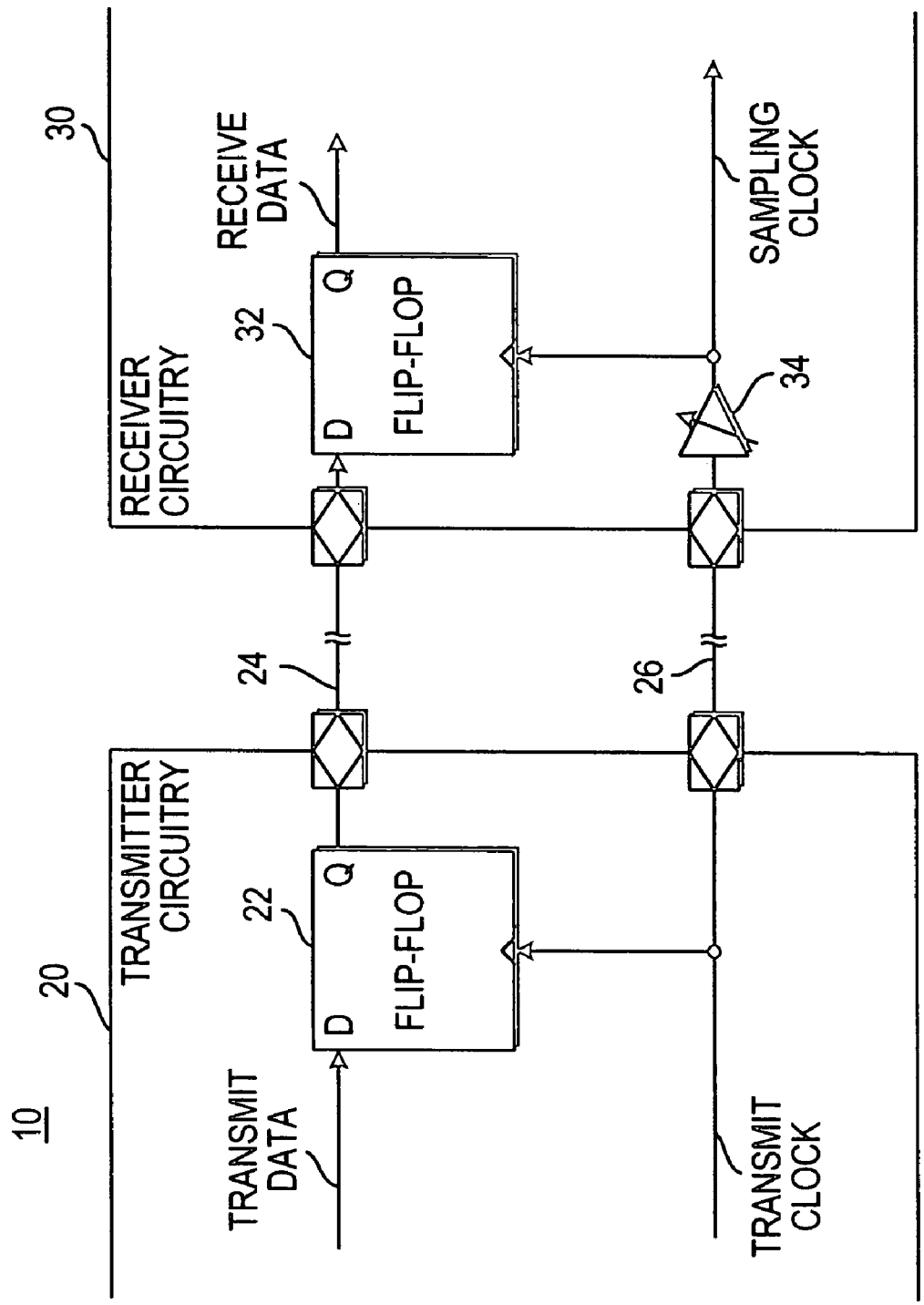
FIG. 1 is a simplified schematic block diagram of portions of an illustrative system that can be constructed and operated in accordance with the invention.

An illustrative use of the invention is shown in FIG. 1. Illustrative system 10 includes transmitter circuitry 20 and receiver circuitry 30. What is shown in FIG. 1 may be only portions of elements 20 and 30. Thus each of those elements may include more circuitry that is not shown in FIG. 1. Elements 20 and 30 may be any type or types of circuitry. For example, both of elements 20 and 30 may be programmable logic integrated circuit devices ("PLDs"), but many other types of circuits are also possible for elements 20 and 30.

Element 20 is a transmitter of data and clock signals to element 30. These may be only some of the functions performed by elements 20 and 30, but they are the relevant ones for present purposes. Accordingly, for convenience and simplicity of reference herein, elements 20 and 30 will sometimes be referred to as transmitter circuitry 20 and receiver circuitry 30, respectively.

Data to be transmitted by transmitter circuitry 20 is clocked through flip-flop 22 in synchronism with a transmit clock signal of circuitry 20. The data signal output by flip-flop 22 is applied to transmission line 24 for transmission to receiver circuitry 30. The transmit clock signal is applied to transmission line 26 for transmission to receiver circuitry 30.

The data signal received by receiver circuitry 30 is applied to the D input terminal of flip-flop 32. The clock signal received by receiver circuitry is applied to phase adjustment circuitry 34. Because of possible differences in the transmission characteristics of transmission lines 24 and 26, the data and clock signals received by receiver circuitry 30 may have become "skewed" relative to one another in traveling from transmitter 20 to receiver 30. As is well known to those skilled in the art, skew refers to one signal being delayed relative to another signal. In this case skew may mean that the clock and data signals received by receiver circuitry 30 no longer have their original phase relationship. This can make the received clock signal suboptimal or even unacceptable for use in clocking flip-flop 32 to properly take the received data signal into receiver circuitry 30. The received data may simply be read incorrectly because the received clock signal does not have the proper phase relationship to it. Variable phase adjustment circuitry 34 is therefore provided in accordance with this invention to derive from the received clock signal (and the received data signal) a sampling clock signal that is much better phase-synchronized (or phase-aligned) with the received data. This sampling clock signal can then be used to clock the received data signal through flip-flop 32 with a very high degree of reliability and with no or extremely low error in interpreting the received data.

Figure 2:
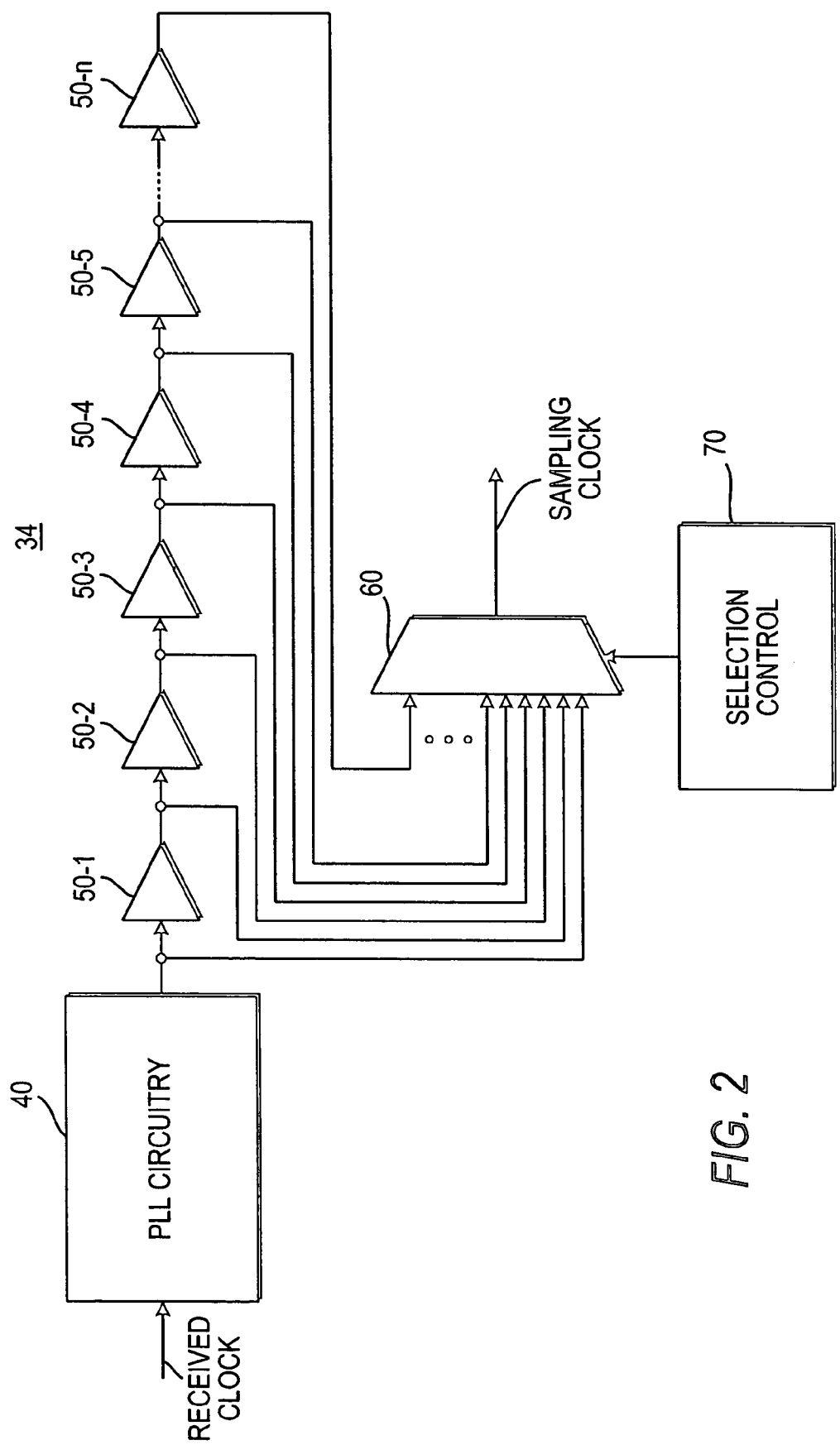
FIG. 2 is a more detailed, but still simplified, schematic block diagram of an illustrative embodiment of a portion of a system like that shown in FIG. 1 in accordance with the invention.

An illustrative embodiment of a portion of variable phase adjustment circuitry 34 is shown in FIG. 2. This portion of circuitry 34 includes phase locked loop ("PLL") circuitry 40, a series of fixed delay elements 50-1 through 50-n, selection or multiplexer circuitry 60, and selection control circuitry 70.

PLL circuitry 40 can itself be conventional. It receives the reference clock signal (from transmission line 26 in FIG. 1) and outputs a new clock signal having frequency and phase locked to the frequency and phase of the received clock signal. This new clock signal may have been reshaped (as compared to the received clock signal) so that its changes in level (transitions or edges) are better defined and more regular. The frequency of the new clock signal output by PLL circuitry 40 may be the same as the received clock signal frequency, or it may be some multiple or fraction (usually integer) of the received clock signal frequency.

The clock signal output by PLL circuitry 40 is passed successively through a plurality of serially-connected, fixed delay circuits 50-1 through 50-n. The delay D introduced by each of circuits 50 is preferably the same for all of those circuits. This fixed amount of delay D is preferably at least a significant fraction of the time duration of each bit in the data signal received via lead 24 (FIG. 1). This individual data bit time duration is sometimes referred to herein as the "unit interval" or "UI." D is also preferably not an amount of time having a simple (e.g., low integer multiple or low integer fractional) relationship to UI. The goal is to enable selection of a sampling position in the eye of the incoming data signal with no greater than a relatively small fraction of the UI to the next possible sampling position. An example of such a "relatively small fraction" is 0.125 UI, but the exact application may require finer granularity or may tolerate a larger bound. This goal is typically achieved in accordance with the invention by effectively overlaying multiple sampling positions not limited to a single UI across the eye. The preferences stated herein regarding the relationship between D and UI are helpful in achieving this goal. For example, in accordance with the above-stated preferences, D is preferably not something like exactly 50% of UI, 33.3333% of UI, 25% of UI etc. Examples of more preferred values are 16%, 18%, 27%, 29%, or 31% of UI. But these are only examples, and there are many other equally suitable relationships between D and UI. Also in accordance with the above-stated preferences, D is preferably sufficiently large so that the sum of all of the available Ds is at least greater than 2 times UI. (See also the next paragraph in which it is made clear that "D" as used in stating this and other relationships herein means the actual amount of time delay used, minus any whole UIs that are included in that amount of delay.) In other words, the total time delay of all of elements 50-1 through 50-n (minus any whole UIs that are included in the delay of each element 50) is preferably greater than 2UI. The value of n (i.e., the number of elements 50) can also be selected to help satisfy this preference. It is preferred that D not be too small because it can be difficult to repeatably manufacture components for producing very small amounts of delay, especially such components that are all desired to have the same, predetermined amount of delay. Thus D is preferably not too small a fraction of UI.

The discussion herein generally assumes that D is less than UI. But this may not be absolutely necessary, and it may be possible for D to be greater than UI. If that is done, then the relationships between D and other parameters that are described herein continue to apply when D, as used in these relationship descriptions, is understood to be net of any UI(s) that are actually included in the amount of delay that is used. For example, if the D actually used is 116% of UI or 216% of UI, then D as used in the relationships described herein should be understood to be 16% of UI. Words like "delay" and "phase shift" are used herein as alternatives for D, and what is said about D in this paragraph also applies to delay, phase shift, and the like as alternates for D.

At any given time, multiplexer 60 selects the output of PLL circuitry 40 or the output of one of delay circuits 50-1 through 50-n as the sampling clock signal. Multiplexer 60 is controlled to make this selection by selection control circuitry 70. As will be described in more detail below, this is done to determine whether the phase shift of each multiplexer 60 input signal causes the sampling clock to traverse past an edge (transition) in the incoming data signal. A synchronization circuit (described below) is used to track an incoming training pattern to make the determination referred to in the preceding sentence.

Figure 3:
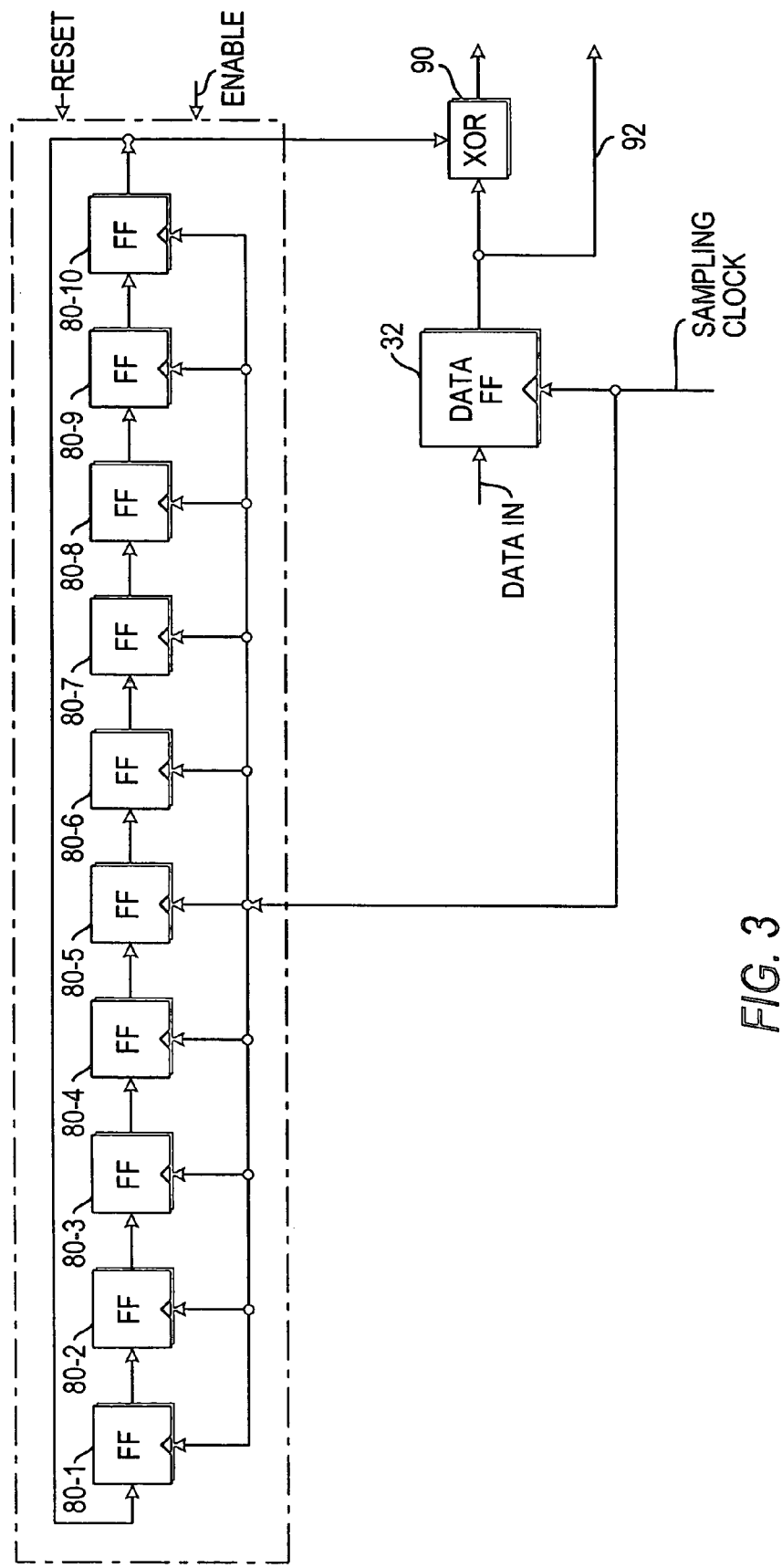
FIG. 3 is a more detailed, but still simplified, schematic block diagram of an illustrative embodiment of a phase delay circuit that can be used in a system like that shown in FIG. 1 in accordance with the invention.

An illustrative embodiment of portions of selection control circuitry 70 (FIG. 2) is shown in FIG. 3. The FIG. 3 circuitry includes a plurality of flip-flops 80-1 through 80-10 connected in a closed loop series. This series is such that an information bit shifts from flip-flop 80-1 to flip-flop 80-2, to flip-flop 80-3, and so on to flip-flop 80-10, and then back to flip-flop 80-1. Flip-flops 80 store (and selectively recirculate) a pattern of ten "training bits" (or a "training pattern"). In some applications consecutive identical digits ("CID") are grouped together to form the training pattern (e.g., five ones followed by five zeroes). A training pattern is usually a repeated pattern of bits to allow synchronization between devices before transmission of data. Although the training pattern assumed herein is five ones followed by five zeros, it will be understood that this is only illustrative, and that other sizes and arrangements of training patterns can be used instead, if desired.

To do the comparison between the sampled training pattern and the expected training pattern, the output signal of flip-flop 80-10 is applied to one input terminal of EXCLUSIVE OR ("XOR") gate 90 (in addition to being applied to the data input terminal of flip-flop 80-1). The other input to XOR gate 90 is the output of data flip-flop 32 (also shown in FIG. 1). As has already been mentioned in connection with FIG. 1, flip-flop 32 is clocked by the sampling clock signal. The sampling clock signal is also used to clock flip-flops 80. Flip-flops 80 are enabled to respond to this clock signal when the "enable" signal in FIG. 3 is asserted (e.g., logic 1). Connection 92 is provided to allow the output signal of flip-flop 32 to bypass XOR gate 90, especially during so-called "normal" operation of the circuitry, which follows the "training period" of operation described beginning in the next paragraph.

During an initial "training period" of operation, training data corresponding to the training pattern (five ones followed by five zeros) is transmitted repeatedly by transmitter circuitry 20 to receiver circuitry 30. At the start of the training period flip-flops 80-1 through 80-5 contain the five zeros of the training pattern, flip-flops 80-6 through 80-10 contain the five ones of the training pattern, and the de-asserted (e.g., logic 0) enable signal does not allow the sampling clock signal to shift the training pattern in the flip-flops. Accordingly, the training pattern is at a particular location in flip-flops 80 and is not recirculating in those flip-flops. Flip-flops 80 are resettable to this initial condition by assertion of the reset signal shown in FIG. 3. The data along the upper line in FIG. 4a shows the starting or reset condition of the training pattern in flip-flops 80.

Also at the start of the training period, selection control circuit 70 (FIG. 2) is controlled to cause multiplexer 60 to select the output signal of PLL circuitry 40 as the sampling clock signal. As the training period proceeds, control circuitry 70 causes multiplexer 60 to select as the sampling clock signal the output signals of delay circuit elements 50-1 through 50-n, one after another in order (i.e., the output of 50-1, then the output of 50-2, then the output of 50-3, and so on through selection of the output of 50-n). The conditions under which control circuitry 70 causes multiplexer 60 to step from outputting one of its inputs to the next are described later in this specification.

As has been said, during the training period the incoming data (applied to flip-flop 32 in FIGS. 1 and 3) is a succession of repetitions of training data corresponding to the training pattern. This data is clocked through flip-flop 32 by the sampling clock signal output by multiplexer 60 (whatever that sampling clock signal happens to be at any given time). Representative data output by flip-flop 32 very early in the training period is shown on the lower line in FIG. 4a.

Figure 4A:
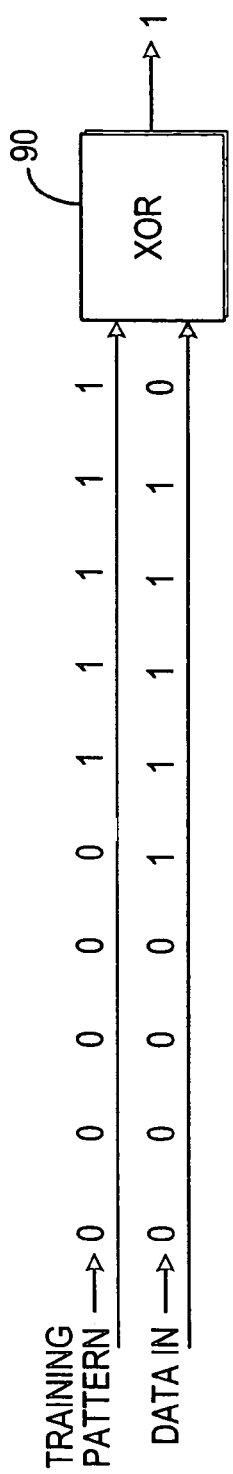
FIGS. 4a-4c show illustrative operating conditions of one element in FIG. 3 at various times during operations in accordance with the invention.

In FIG. 4a (and other similar FIGS. 4b and 4c) vertically aligned data bits are concurrent. Thus FIG. 4a shows (immediately adjacent to XOR gate 90) application of a training pattern 1 (from flip-flop 80-10 in FIG. 3) to the upper input to XOR gate 90, at the same time that a 0 in the incoming data signal is being applied to the lower input to the XOR gate. The condition depicted in FIG. 4a merely reflects an arbitrary (but possible) starting or very early training period condition of signals in the circuitry.

Figure 4B:
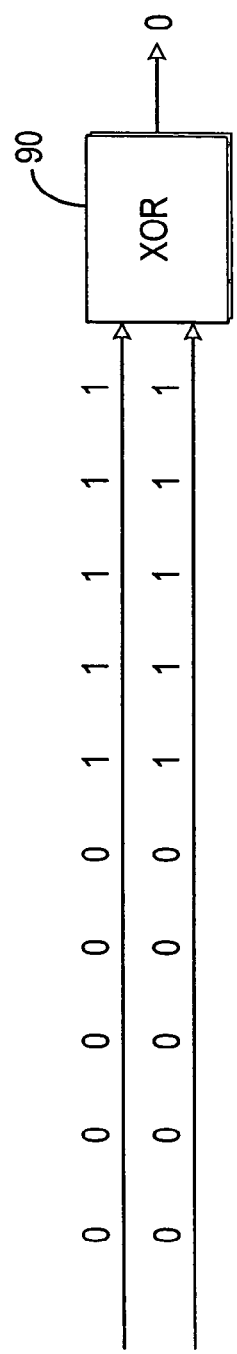

Assuming that the training period begins with signals as shown in FIG. 4a, the 1 output signal of XOR gate 90 (applied to control logic circuitry 110 in FIG. 5) indicates that the incoming data (lower line in FIG. 4a) is not aligned with the training pattern data (upper line in FIG. 4a). The enable output signal of control logic circuitry 110 (which is the enable input signal in FIG. 3) is therefore de-asserted until the output signal of XOR gate 90 first goes to 0 as shown in FIG. 4b. As long as the enable signal is de-asserted, the training pattern does not recirculate in flip-flops 80 (FIG. 3).

The first 0 output of XOR gate 90 (FIG. 4b; detected by control logic circuitry 110 in FIG. 5) indicates that the training information in the incoming data (lower line in FIG. 4b) is now aligned with the training pattern (upper line in FIG. 4b). Control logic circuitry 110 therefore now asserts the enable signal (FIG. 3) so that the training pattern in flip-flops 80 is recirculated by the sampling clock signal.

Figure 4C:
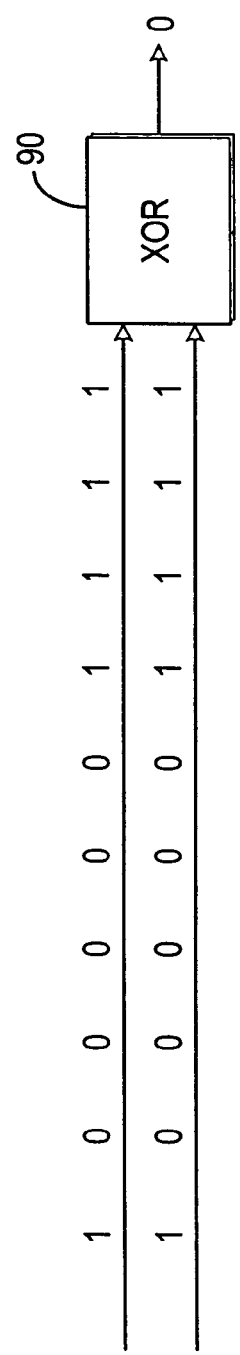

Control logic circuitry 110 (FIG. 5) now looks for 0 outputs from XOR gate 90 during the successive incoming data samples taken by the sampling clock signal acting on flip-flop 32 (FIGS. 1 and 3). FIG. 4c, for example, shows that the next incoming data sample (after the one that first caused the output of XOR gate 90 to go to 0 as shown in FIG. 4b) leaves the output of XOR gate 90 at 0 because the training pattern (upper line in FIG. 4c) has advanced in its recirculation in synchronism with the incoming training data sampling. Extrapolating from what is shown by the progression from FIG. 4b to FIG. 4c, it will be apparent that with this illustrative data the output of XOR gate 90 will remain 0 for at least ten successive samples of the incoming data. Control logic circuitry 110 causes selection control circuitry 70 (FIG. 2) to increment its selection after the output signal of XOR gate 90 has been 0 for ten successive data samples. Circuitry 110 also causes circuitry 70 to increment its selection under other conditions that will be described very soon below.

It may now be helpful to look at FIGS. 6a-6e. Each of these FIGS. shows one complete presentation of the training pattern in the incoming data signal applied to flip-flop 32 (FIGS. 1 and 3). FIG. 6a shows an early presentation of this training data, FIG. 6b shows the next presentation of the training data, and so on. It will be understood that presentation of the training data also continues after what is shown in FIG. 6e. FIG. 6a specifically identifies the location and duration of one representative unit interval ("UI") in the data. Consistent with the example being discussed, each of FIGS. 6a-6e shows that the training pattern is five 1s (toward the right in each of these FIGS.) followed by five 0s (toward the left in each of these FIGS.).

FIG. 6a shows an illustrative example of where ten samples of the first presentation of the incoming data might be taken using the first sampling clock signal selected by multiplexer 60. Because this first clock signal selection is the output signal of PLL circuitry 40, each of the FIG. 6a data sampling locations is shown by an arrow labeled 0. In the particular example shown in FIG. 6a, each unit interval ("UI") in the data is sampled relatively close to the start of the UI. This sampling example keeps the output signal of XOR gate 90 logic 0 for the ten successive data samples shown.

After the ten samples shown in FIG. 6a, control logic circuitry 110 (FIG. 5) causes selection control circuitry 70 (FIG. 2) to increment its selection so that the sampling clock signal becomes the output signal of delay element 50-1. The output clock is desired to be glitch-less to ensure that no unexpected samples are captured. The resultant clock should be stretched in a single period between edges to guarantee no additional rising/falling edges are produced. As shown in FIG. 6b, deriving the sampling clock signal from element 50-1 causes the samples taken during the next incoming data signal presentation of the training pattern to be later in each UI by the amount of time D. The resulting incoming data samples in FIG. 6b are at the locations shown by the arrows labeled 1 (because the sampling clock signal is selected as the output signal of delay circuit element 50-1 in FIG. 2). Control logic circuitry 110 in FIG. 5 again looks for the output of XOR gate 90 to remain 0 for ten successive incoming data signal samples. This is what happens for the illustrative data sampling shown in FIG. 6b.

After the ten data samples shown in FIG. 6b, control logic circuitry 110 in FIG. 5 again causes selection control circuitry 70 to increment the selection of the source for the sampling clock signal. In particular, multiplexer 60 now causes the output signal of delay circuit 50-2 to be used as the sampling clock signal. FIG. 6c shows where this sampling clock signal selection causes the next incoming data signal presentation of the training pattern to be sampled (i.e., at the locations indicated by the arrows labeled 2 in FIG. 6c). This sampling again keeps the output signal of XOR gate 90 logic 0 for ten more samples. Control logic circuitry 110 detects this and thereafter causes elements 60 and 70 to again increment the sampling clock signal source so that the sampling clock signal now comes from delay circuit element 50-3.

FIG. 6d shows how sampling of the next incoming data signal presentation of the training data begins, using the sampling clock signal derived from delay element 50-3. The arrows labeled 3 in FIG. 6d show the locations of samples taken using this sampling clock signal selection. The first four (left-most four) of these samples leave the output signal of XOR gate 90 at logic 0. But the next (fifth) sample labeled 3 in FIG. 6d is taken after the transition from 1 to 0 in the incoming data signal. This causes the output signal of XOR gate 90 to switch from logic 0 to logic 1, which indicates that the sampling clock has moved past the edge of the training pattern. The purpose of the circuit is to create a reference point where the training pattern occurs. Once the edges are known, then the best sampling position (e.g., in the center of the eye) can be selected (e.g., algorithmically). Control logic circuitry 110 recognizes that the output signal of XOR gate 90 has switched from logic 0 to logic 1 and performs the following functions: (1) it records that using delay element 50-3 as the sampling clock signal source caused a transition in the incoming data signal training data to be passed; (2) it resets the training pattern in flip-flops 80 (FIG. 3) to the initial condition shown on the upper line in FIG. 4a; (3) it de-asserts the enable signal; (4) it causes elements 60 and 70 to increment to deriving the sampling clock signal from the next possible source (i.e., the output of delay circuit element 50-4); and (5) it reverts to looking for logic 0 to occur again in the output signal of OR gate 90. In effect, the foregoing returns the operating condition of the apparatus to something like the condition shown in FIG. 4a.

During the remainder of the presentation of the incoming data sequence shown in FIG. 6d, that data is sampled using the sampling clock signal that now comes from delay circuit element 50-4. This is shown by the arrows labeled 4 in FIG. 6d. Because these samples all detect data that is 0, while the training pattern in flip-flops 80 has been reset to, and is held in, its initial condition (in which flip-flop 80-10 applies 1 to the associated input of XOR gate 90), the XOR gate continues to output logic 1.

The condition described at the end of the preceding paragraph continues until the first (right-most) sample is taken in FIG. 6e. This causes the output signal of XOR gate 90 to change back to logic 0 again (e.g., as in FIG. 4b) because the incoming training data is again aligned (or re-aligned) with the training pattern in flip-flops 80. This re-alignment is detected by control logic circuitry 110, which re-asserts the enable signal and again begins to look for the XOR gate output to remain 0 for ten successive samples of the incoming data signal.

The process of progressing along the chain of delay elements 50 continues until the output signals of all of elements 50 have been used, one after the other, in order.

When the output signals of all of delay elements 50 have been used as described above, control logic circuitry 110 analyzes the data that has been gathered to pick the best sampling clock phase for use during subsequent normal (i.e., non-training mode) operation of the circuitry. The "best sampling clock phase" may be the one that is closest to the center of the eye of the incoming data UIs, or the sampling clock phase that best satisfies any other desired criteria. In the following discussion it will be assumed (for the most part) that the objective is to identify the sampling clock signal having phase that is closest to the center of the eye of the incoming data UIs, but it will be understood that other objectives can be satisfied by similar analysis if desired.

Figure 7:
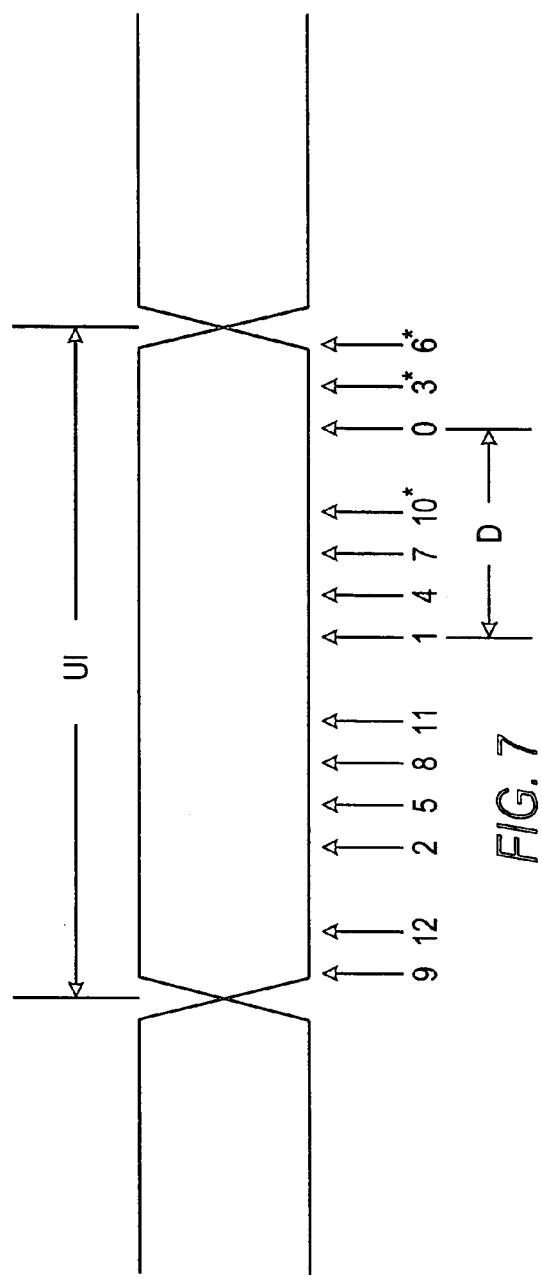
FIG. 7 illustrates a data signal waveform characteristic with associated illustrative indicia that are useful in explaining operations in accordance with the invention.

For the following discussion it may be helpful to consider FIG. 7. This FIG. shows a single representative eye of a data signal. In addition, FIG. 7 shows 13 sampling locations (from training mode operation of the circuitry as described above) that have been superimposed on this one representative eye. The arrow labeled 0 in FIG. 7 is like any of the arrows labeled 0 in FIG. 6a; the arrow labeled 1 in FIG. 7 is like any of the arrows labeled 1 in FIG. 6b; the arrow labeled 2 in FIG. 7 in like any arrow 2 in FIG. 6c; the arrow labeled 3\* is like any arrow 3 in FIG. 6d; and so on. The arrows with asterisked numbers in FIG. 7 are for sampling locations that caused a transition to be passed when that sampling location was used during training mode as described above.

Analysis of sampling location information like that shown in FIG. 7 can be used to approximate with a high degree of accuracy locations of the transitions in the received data signal and hence the phase of that signal. For example, it can be determined from the illustrative information shown in FIG. 7 that the transition that opens the eye of a UI is before the earliest of the sampling locations shown (in this case before (or to the right of) sampling location 6\*). It is also known that this eye-opening transition is no more than D prior to the earliest sampling location within UI. Indeed, by having effectively folded at least two (and preferably more than two) sampling location subseries onto the UI, the approximate knowledge of the location of the eye-opening transition relative to the various sampling locations becomes increasingly precise. In the preceding sentence a first subseries of the sampling locations is 0, 1, 2; a second subseries is **3\*, 4, 5; a third subseries is 6\*, 7, 8, 9; and a fourth subseries is 10\*, 11, 12. Because these various subseries preferably do not fall directly on top of one another (because of the selection of various parameters such as the relationships among UI, D, and n as described earlier in this specification), but instead spread themselves out across UI, they provide more accurate approximation of transition locations than the relatively coarse magnitude of fixed delay interval D. For example, the illustrative data shown in FIG. 7** locates the eye-opening transition in the data to within no more than about 0.4 D, and in most cases significantly less than that (e.g., less than about 0.2 D). Precision can be further improved by extending the training mode to include more non-overlying subseries of sampling locations (e.g., by increasing parameter n).

Figure 7A:
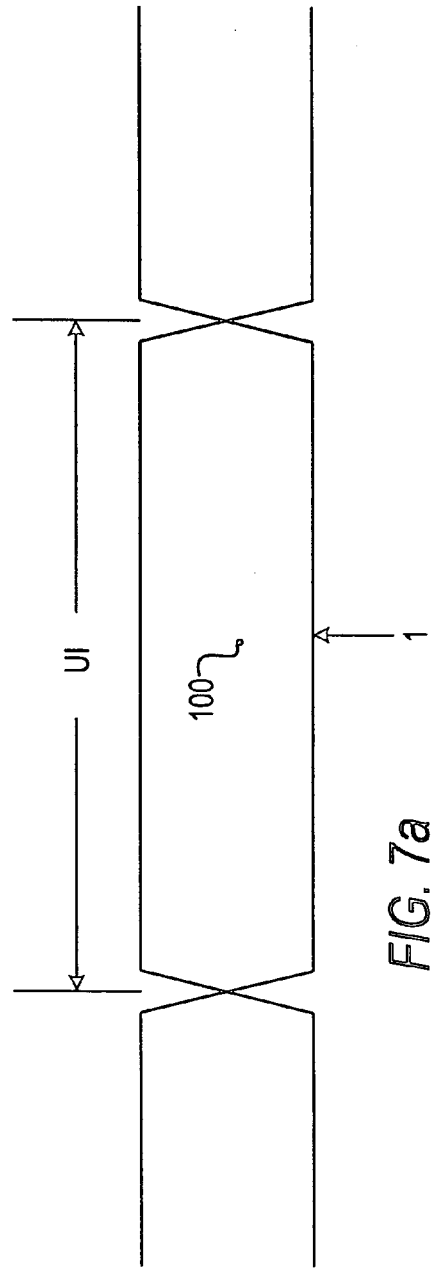
FIG. 7a is similar to FIG. 7 but shows an illustrative final selection of a sampling location closest to the center of the eye of a received data signal.

Control logic circuitry 50 can perform any of several types of analysis on information of the type shown in FIG. 7 to identify the best final sampling location for sampling the incoming data signal during normal (post-training mode) operation of the circuitry. For example, control logic circuitry 110 can include a look-up table that converts an input identifying the earliest sampling location identified in the manner illustrated by FIG. 7 to a corresponding sampling location nearest the center of UI. In the particular example shown in FIG. 7, supplying sampling location 6 to the look-up table as an input would cause the look-up table to output location 1 as the sampling location closest to the center of the eye of the incoming date signal. Control logic circuitry 110 can then produce an output (or outputs) for causing elements 60 and 70 to select the output signal of delay circuitry 50-1 for use as the sampling clock signal during normal (post-training mode) operation of the circuitry. FIG. 7a shows this choice of sampling location 1 and its closest proximity to the center 100 of the eye (center of UI). As another example, generally similar to what is shown in FIG. 7, if location 0 was found to be closest to the eye-opening transition, then the look-up table would output location 11 as the one closest to the center of the eye. If rather than the center of the eye, a somewhat later sampling location was sought for normal mode operation, then the look-up table would be programmed differently (e.g., to output location 11 in response to an input of location 6, or to output location 5 in response to an input of location 0.)

Use of a look-up table is just one of many ways in which control logic circuitry 110 can analyze sampling location information collected during training mode to select a final sampling location for use during subsequent normal mode operation. Other examples include decision tree logic or the performance of an algorithm.

Figure 8:
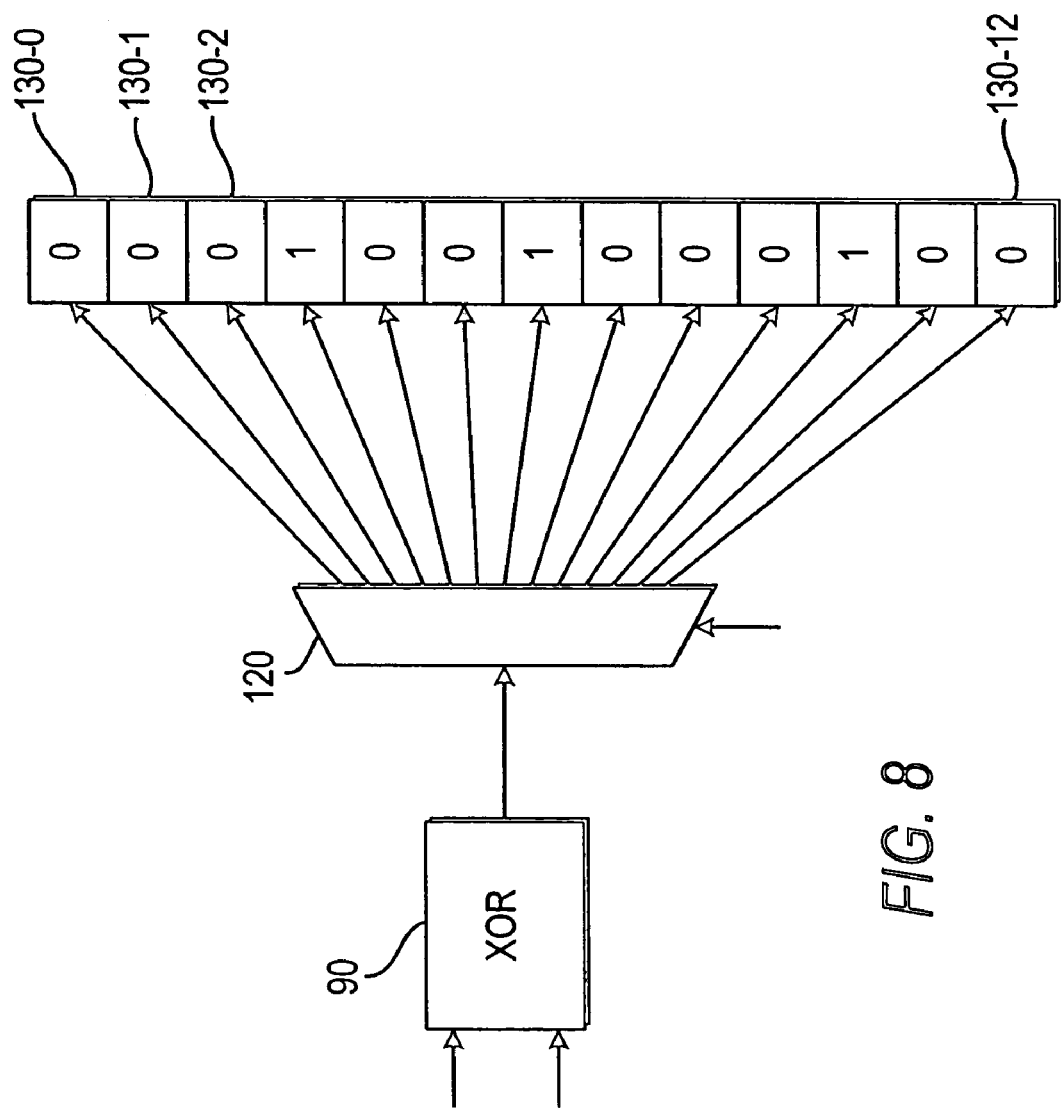
FIG. 8 is a simplified schematic block diagram showing an illustrative embodiment of circuitry that can be included in the FIG. 5 circuitry in accordance with the invention.

FIG. 8 shows illustrative circuitry that can be part of control logic circuitry 110 (FIG. 5) for recording the results of the training mode operations described above. The FIG. 8 circuitry includes a repeated depiction of XOR gate 90, demultiplexer 120, and a plurality of registers 130-0 through 130-12. There is one register 130 for each possible version of the sampling clock signal. Thirteen registers 130 are shown for consistency with the example depicted by FIG. 7, but any number of such registers can be provided to match the number of possible versions of the sampling clock signal. Demultiplexer 120 is controlled to direct the output signal of XOR gate 90 to the register 130 associated with each sampling clock signal version at the end of use of that version as training mode proceeds. For example, in the case illustrated by FIG. 7 (and also FIGS. 6a-6e), at the end of use of the sampling clock signal version that comes directly from PLL circuitry 40 (FIG. 2), the output signal of XOR gate 90 is 0, and demultiplexer 120 causes that value to be stored in register 130-0. At the end of use of the sampling clock signal version that comes from delay circuit element 50-1, the output signal of XOR gate 90 is again 0. Demultiplexer 120 causes that value to be stored in register 130-1. The XOR gate 90 output at the end of use of the signal from element 50-2 is 0, which demultiplexer 120 causes to be stored in register 130-2. The XOR gate 90 output at the end of use of the signal from element 50-3 is 1. This occurs when the fifth sample from the right in FIG. 6d is being processed. Demultiplexer 120 causes this value to be stored in register 130-3. This process continues until training data collection has been completed.

From the foregoing it will be apparent that registers 130 record (1) which reference clock signal versions have not caused the incoming training data to be so misaligned with the training pattern that a transition in the incoming training data is passed during comparison of the training pattern and the incoming training data, and (2) which clock signal versions have caused a transition in the incoming training data to be passed. Consistent with the example shown in FIG. 7, FIG. 8 shows that sampling locations 0, 1, 2, 4, 5, 7, 8, 9, 11, and 12 have not caused a transition to be passed (indicated by 0 in the register 130 associated with each of those sampling locations), while sampling locations 3, 6, and 10 have caused a transition to be passed (indicated by 1 in the register 130 associated with each of those sampling locations). This record of which sampling locations have and have not caused a transition to be missed is convenient for use in analysis of the training operations as described earlier.

Figure 9:
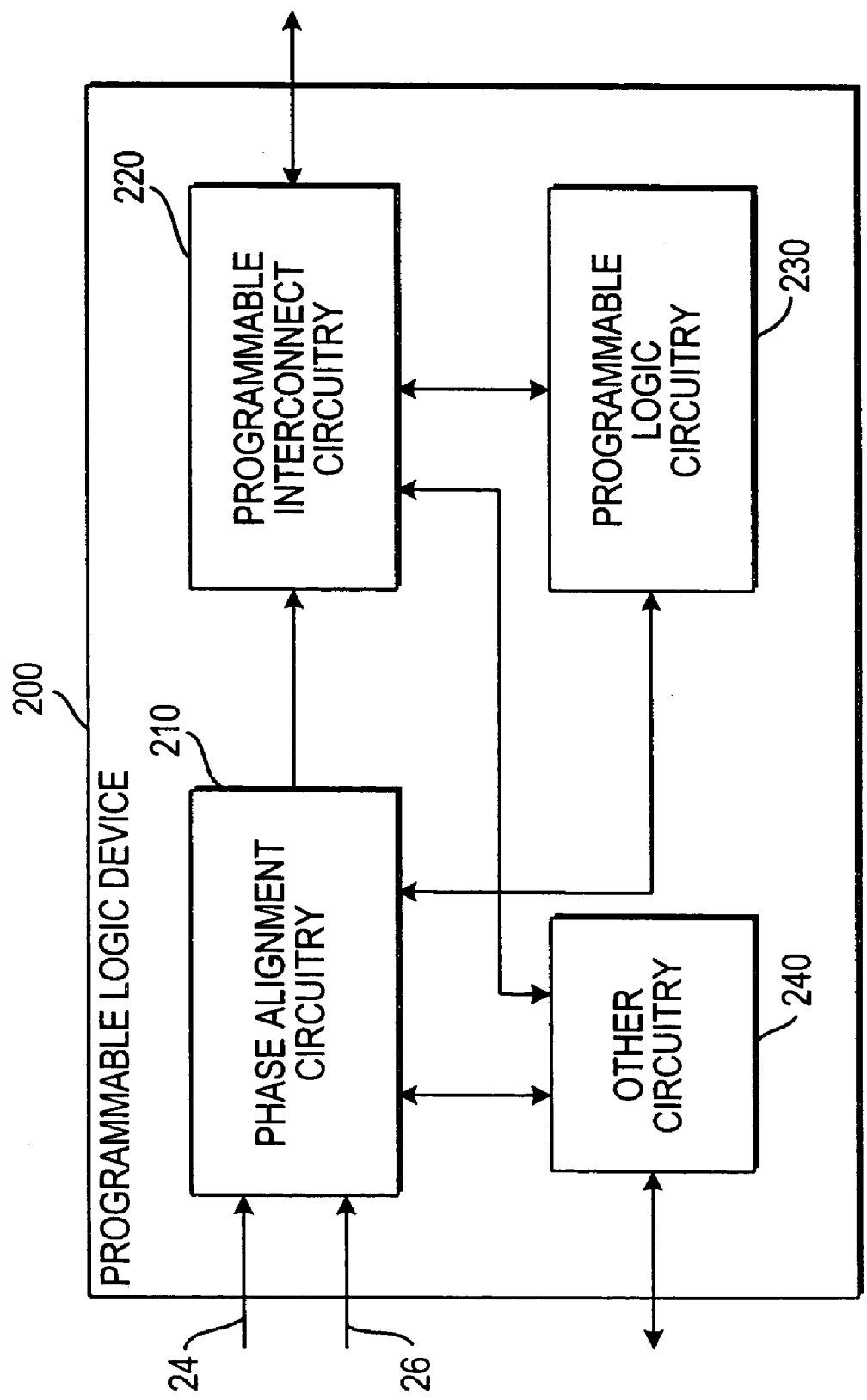
FIG. 9 is a simplified block diagram further showing an illustrative implementation of the invention.

An illustrative context for use of the invention is further shown in FIG. 9. This FIG. shows phase alignment circuitry 210 constructed and operated as described above in a programmable logic device ("PLD") 200. PLD 200 also includes such other elements as programmable interconnect circuitry 220, programmable logic circuitry 230, and other circuitry 240 (e.g., blocks of memory, digital signal processing ("DSP") circuitry, or the like, which may also include programmable aspects). In a typical architecture and configuration of PLD 200, phase alignment circuitry 210 supplies a captured and retimed data signal to programmable interconnect circuitry 220. Circuitry 220 can route that signal to other destinations such as programmable logic circuitry 230 or other circuitry 240. Circuitry 220 also routes signals to, from, and between elements 230 and 240 and various portions of those elements. Some of the functions required in or of phase alignment circuitry 210 may be wholly or partly controlled by, supported by, and/or performed in elements 230 and/or 240. In addition to the inputs 24 and 26 (similar to inputs 24 and 26 in other FIGS. herein), PLD 200 may have other inputs and/or outputs (e.g., connected to elements 220 and/or 240).

Figure 10:
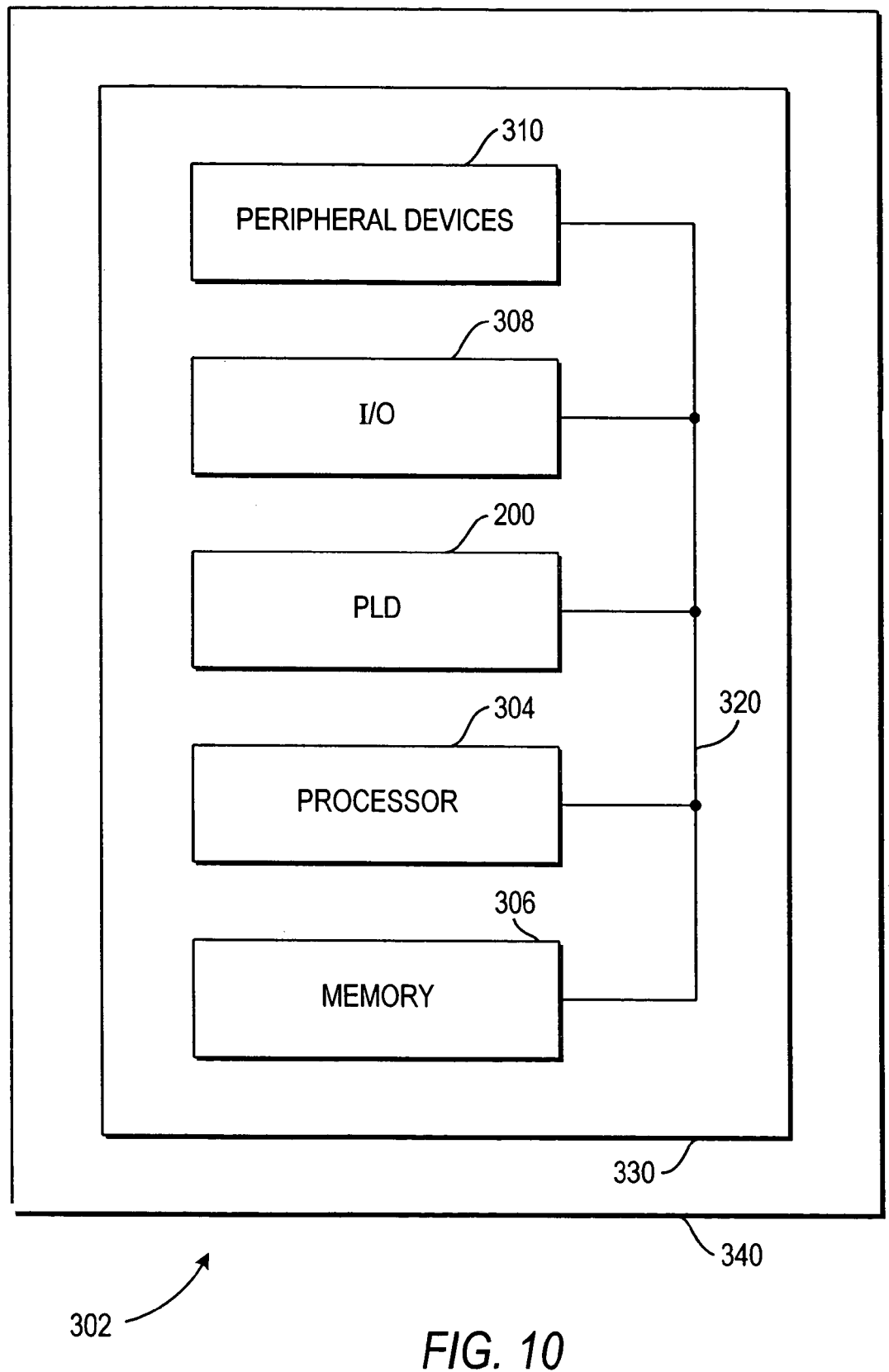
FIG. 10 is a simplified block diagram of an illustrative larger system that can be constructed in accordance with the invention.

FIG. 10 illustrates a PLD 200 (e.g., as in FIG. 9 and including circuitry 210 in accordance with the invention) in a data processing system 302. Data processing system 302 may also include one or more of the following components: a processor 304; memory 306; I/O circuitry 308; and peripheral devices 310. These components (and PLD 200) are coupled together by a system bus or other interconnections 320 and are populated on a circuit board 330 (e.g., a printed circuit board) that is contained in an end-user system 340. Signalling among elements 200, 304, 306, 308, and 310 may employ phase alignment as described herein to any desired extent. For example, any of components 304, 306, 308, and 310 may also include phase alignment circuitry (like 210) in accordance with this invention.

System 302 can be used in a wide variety of applications, such as computer networking, data networking, instrumentation, video processing, digital signal processing, or any other application. PLD 200 may be used to perform a variety of different logic functions. For example, circuitry 200 may be configured as a processor or controller that works in cooperation with processor 304. PLD 200 may also be used as an arbiter for arbitrating access to a shared resource in system 302. In yet another example, PLD 200 can be configured as an interface between processor 304 and one of the other components in system 302. It should be noted that system 302 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention. For example, the length and bit configuration of the training pattern can be different from what is illustratively shown herein. Many aspects of what is shown and described herein can be made programmable (and therefore variable) if the invention is implemented in programmable circuitry such as a programmable logic device ("PLD"). Similarly, portions or all of the circuitry implementing the invention can be programmable circuitry (e.g., of a PLD) if that is how the invention is implemented.

What is claimed is:

1. A method of detecting phase of transitions in a data signal relative to a reference clock signal comprising:
   producing a plurality of phase-shifted versions of the reference clock signal;
   using each of the plurality of phase-shifted versions of the reference clock signal in order of magnitude of phase shift to sample the data signal and thereby produce samples of the data signal;
   comparing the samples to a training pattern that is initially aligned with training data in the data signal;
   re-aligning the training pattern with the training data each time use of one of the plurality of phase-shifted versions of the reference clock signal causes the training pattern to become misaligned with the training data; and
   analyzing information including which of the plurality of phase-shifted versions of the reference clock signal caused misalignment to approximate the phase of the transitions.

2. The method defined in claim 1 further comprising:
   selecting one of the versions for use in sampling the data signal after the training data based at least in part on the phase of the transitions as approximated in the analyzing.

3. The method defined in claim 2 wherein the data signal has a unit interval corresponding to duration of each bit in the data signal, and wherein the selecting selects one of the versions that is near the center of the unit interval.

4. The method defined in claim 1 wherein each of the plurality of phase-shifted versions is delayed by the same amount of delay relative to an immediately less phase-shifted one of the versions.

5. The method defined in claim 4 wherein the delay is selected so that the unit interval is not an integer multiple of the delay.

6. The method defined in claim 5 wherein the plurality of phase-shift versions of the reference clock signal includes n versions, and wherein n times the delay is greater than two unit intervals.

7. Apparatus for detecting phase of transitions in a data signal relative to a reference clock signal comprising:
   a plurality of delay circuit elements for producing a plurality of phase-shifted versions of the reference clock signal;
   selection circuitry for selectively selecting each of the plurality of phase-shifted versions of the reference clock signal in order of magnitude of phase shift as a sampling clock signal for sampling the data signal;
   comparison circuitry for comparing samples of the data signal, taken using the sampling clock signal, to a training pattern;
   alignment circuitry for initially aligning the training pattern with training data in the data signal and for subsequently re-aligning the training pattern with the training data each time use of one of the plurality of phase-shifted versions of the reference clock signal causes the training pattern to become misaligned with the training data; and
   circuitry for monitoring which of the plurality of phase-shifted versions of the reference clock signal caused misalignment of the training pattern with the training data.

8. The apparatus defined in claim 7 wherein the delay circuit elements are connected in series and all have the same amount of delay.

9. The apparatus defined in claim 8 wherein the amount of delay is selected so that the unit interval is not an integer multiple of the amount of delay.

10. The apparatus defined in claim 9 wherein the plurality of phase-shifted versions of the reference clock signal includes n versions, and wherein n times the amount of delay is greater than two unit intervals.

11. The apparatus defined in claim 7 wherein the alignment circuitry comprises:
    means for selectively recirculating the training pattern in synchronism with the sampling clock signal.

12. The apparatus defined in claim 7 wherein the circuitry for monitoring comprises:
    means for determining the approximate phase of the data signal relative to the reference clock signal based at least in part on which of the versions cause the misalignment.

13. The apparatus defined in claim 7 further comprising:
    means for selecting one of the versions for use in producing a retimed version of the data signal.

14. A programmable logic device including apparatus as defined in claim 7.

15. A digital processing system comprising:
    a processing circuitry;
    a memory coupled to the processing circuitry; and
    a programmable logic device as claimed in claim 14 coupled to the processing circuitry and the memory.

16. A printed circuit board on which is mounted a programmable logic device as claimed in claim 14.

17. The printed circuit board as claimed in claim 16 further comprising:
    a memory mounted on the printed circuit board and coupled to the programmable logic device.

18. The printed circuit board as claimed in claim 16 further comprising:
    processing circuitry mounted on the printed circuit board and coupled to the programmable logic device.

19. Apparatus for detecting phase of transitions in a data signal relative to a reference clock signal comprising:
    a plurality of delay circuit elements for producing a plurality of phase-shifted versions of the reference clock signal;
    selection circuitry for selectively selecting each of the phase-shifted versions of the reference clock signal in order of magnitude of phase shift as a sampling clock signal for sampling the data signal;
    comparison circuitry for comparing samples of the data signal, taken using the sampling clock signal, to a training pattern;
    alignment circuitry for initially aligning the training pattern with training data in the data signal and for subsequently re-aligning the training pattern with the training data each time use of one of the phase-shifted versions of the reference clock signal causes the training pattern to become misaligned with the training data; and circuitry for monitoring which of the phase-shifted versions of the reference clock signal caused misalignment of the training pattern with the training data, wherein the selection circuitry includes means for advancing to a next one of the phase-shifted versions of the reference clock signal after the comparison circuitry detects an instance of data corresponding to the training pattern in the data signal or a non-correspondence between the data signal and the training pattern.

20. Apparatus for detecting phase of transitions in a data signal relative to a reference clock signal comprising:
   a plurality of delay circuit elements for producing a plurality of phase-shifted versions of the reference clock signal;
   selection circuitry for selectively selecting each of the phase-shifted versions of the reference clock signal in order of magnitude of phase shift as a sampling clock signal for sampling the data signal;
   comparison circuitry for comparing samples of the data signal, taken using the sampling clock signal, to a training pattern;
   alignment circuitry for initially aligning the training pattern with training data in the data signal and for subsequently re-aligning the training pattern with the training data each time use of one of the phase-shifted versions of the reference clock signal causes the training pattern to become misaligned with the training data; and
   circuitry for monitoring which of the phase-shifted versions of the reference clock signal caused misalignment of the training pattern with the training data, wherein the alignment circuitry comprises:
     means for selectively recirculating the training pattern in synchronism with the sampling clock signal and wherein the means for selectively recirculating comprises:
     means for halting the recirculating during initial aligning and subsequent re-aligning of the training pattern with the training data.

21. A method of determining an amount of phase shift of a reference clock signal that will render that signal advantageous for use in sampling a data signal that may be skewed relative to the reference clock signal comprising:
   aligning a training pattern with training data in the data signal;
   using a sampling clock signal based on the reference clock signal to sample the data signal and advance the training pattern;
   comparing the advancing training pattern to the data signal samples until the training pattern is complete or until a lack of correspondence between the training pattern and a data signal sample is detected;
   shifting the phase of the sampling clock signal by a predetermined amount after completion of the comparing;
   re-aligning the training pattern with the training data if the comparing is completed by detection of a lack of correspondence;
   repeating the using, comparing, shifting, and re-aligning until the total amount of phase shift due to the shifting is at least greater than the duration of any two successive bits in the data signal; and
   sampling the data signal subsequent to the training data with a phase that is determined based at least in part on information as to which iterations of the comparing were completed by detection of a lack of correspondence.

* * * * *